Sept. 2, 1958  K. HERTEL  2,849,787
CUTTING TOOLS

Filed Feb. 14, 1955  5 Sheets-Sheet 1

INVENTOR:
Karl Hertel
By [signature]
Patent Agent

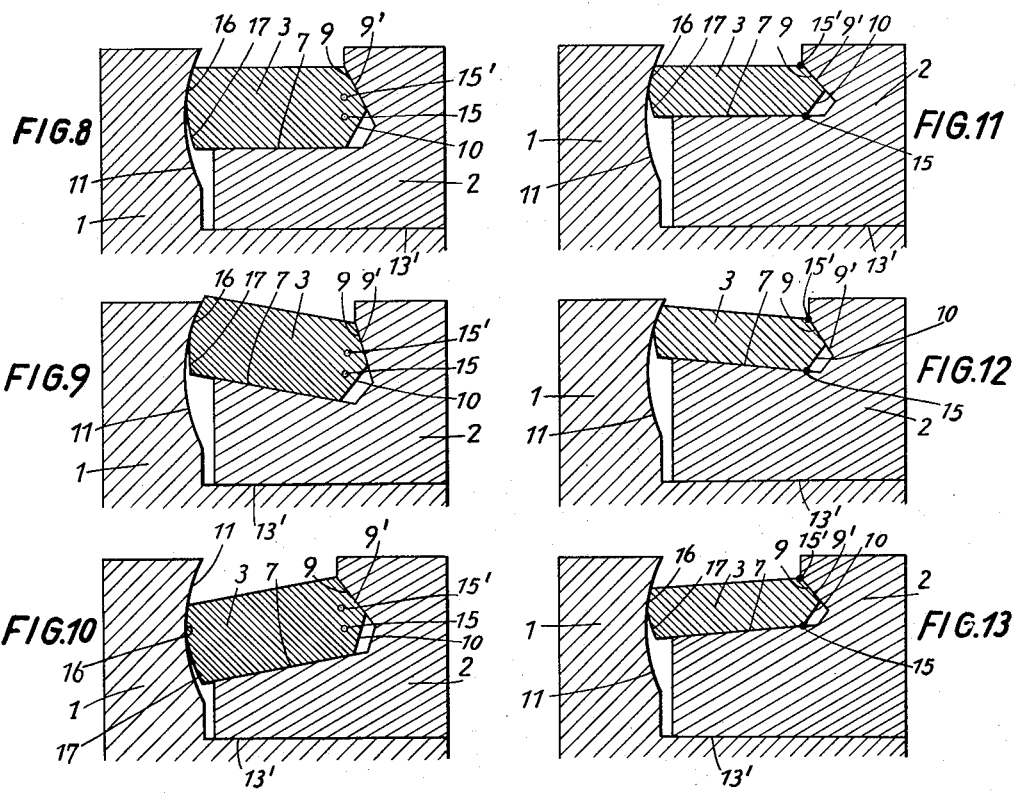

Sept. 2, 1958 K. HERTEL 2,849,787
CUTTING TOOLS
Filed Feb. 14, 1955 5 Sheets-Sheet 3

INVENTOR:
Karl Hertel
By Emi D. Frankel
Patent Agent

INVENTOR:
Karl Hertel

Sept. 2, 1958 K. HERTEL 2,849,787
CUTTING TOOLS

Filed Feb. 14, 1955 5 Sheets-Sheet 5

INVENTOR
Karl Hertel
By
Patent Agent

2,849,787
CUTTING TOOLS
Karl Hertel, Furth, Germany

Application February 14, 1955, Serial No. 487,841

Claims priority, application Germany February 17, 1954

4 Claims. (Cl. 29—96)

The present invention relates to improvements in cutting tools, and more particularly to the kind provided with cemented carbide or similar hard metal tips or inserts.

It is a well-known fact that the introduction of cemented carbides has considerably increased the life of cutting tools. However, the brittleness of such metals and their excessive cost render them prohibitive for making the entire tool including the shank therefrom, which led to the use of steel shanks upon which a cemented carbide tip is brazed. Tools of this kind have, however, the disadvantage that, when the cutting edges of the carbide tip have become dull and need regrinding, the steel shank also has to be reground. This, as well as the difficult operation of brazing the carbide tip to the steel shank, if at all possible, constitute an expensive waste of time and effort. Also, the heat required for brazing the two different parts together and that developed in grinding them is bound to cause structural changes within the carbide tip which may easily cause the tip to break out of the shank or brazing or grinding cracks to form in the carbide tip. Furthermore, both the manufacture, as well as regrinding of such tools consisting of two different materials requires two different grinding wheels, that is, generally speaking, a silicon carbide wheel for grinding the hard-metal tip and a corundum wheel for the steel shank.

These disadvantages of brazed-on carbide tips led to the increased use of cutting tools in which the carbide tip is secured to the tool shank by being clamped thereon. Consequently, the tip may at any time be removed from the shank and reground independently therefrom. If the cutting edge of the carbide tip becomes dull, the entire tip may, after being reground, be pushed forwardly on the shank and can thus be used up almost entirely.

It is the principal object of the present invention to provide a cutting tool of the latter type composed of a tip or insert of cemented carbide or similar hard metal, and a shank for supporting the same, and improved means for securing such insert to the shank.

A feature of the invention for accomplishing this object consists in the provision of a recess in the supporting shank, and a jaw member for securing the carbide insert rigidly within such recess by lateral clamping action thereon. Such lateral clamping action has the advantage over a claw pressing vertically upon the carbide insert that the chip flow is not obstructed by any parts of the supporting shank or its clamping element.

Another feature of the invention resides in shaping the clamping element so as to consist of an angle piece, one arm of which serves as a bearing surface or supporting the carbide insert, and designed so as to be easily exchanged.

Another feature of the invention consists in designing the tool shank and the clamping element thereon so that the latter will only form a relatively small part which may be made of various sizes so that one or another of a large variety of different carbide inserts may be secured in the same tool holder. Thus, the carbide inserts may be made of different width and strength depending upon the material to be cut, the cutting pressure and the width of the cut, and such different inserts only require the clamping element to be made so as to comply with their size and shape. Such possibility of using different carbide inserts of a size depending upon the particular workpiece to be cut results in a considerable saving in valuable carbide material.

A further object of the present invention is to provide a tool holder which itself permits the carbide insert to be adjusted to the desired rake ankle, thus obviating the necessity of grinding the carbide tip itself in accordance with such angle.

A feature of the invention for obtaining the last-mentioned object consists in making the bearing surface of the tool holder for the carbide insert not only of a size and shape in accordance with the particular carbide insert to be used, but also in giving such bearing surface the particular inclination in accordance with the rake angle to be used. Thus, the carbide insert itself may be made of uniform thickness and does not have to be weakened by grinding it according to the required rake angle.

Another object of the present invention is to provide a tool holder for the carbide insert or tip, the shank of which may be made of a steel of lower quality than usually required.

This object of the invention is also accomplished by the new tool design, and the cooperation of a tool shank with a clamping element for securing the carbide insert to the shank, such new design only requiring such clamping element to consist of tempered steel, while the shank itself may be made of a softer metal.

A further object of the invention is to design and provide a tool holder which is of sufficient rigidity to clamp the carbide insert securely thereon and assures that the insert will be supported underneath the cutting edge by a solid base. Such solid support of the carbide insert is necessary to carry off the heat generated by the cutting process, and also to prevent absolutely any vertical vibration of the insert.

In a tool holder in which the shank itself forms the bearing surface of the carbide insert, such vertical vibrations are bound to occur after prolonged use since the cutting pressure gradually deforms the forward edge of the bearing surface, particularly because it never remains even but acts jerkily whenever a chip breaks off. Thus, the forward edge of the bearing surface is gradually hammered down, and it is unavoidable that a small clearance gradually forms between the two contacting surfaces. This is particularly detrimental if in a subsequent cutting operation, there is only a lower cutting pressure which is not sufficient to force the carbide insert solidly upon the forward edge of the bearing surface, so that a small clearance is formed at this area between the adjacent surfaces of the two parts. Such clearance will not only result in harmful vibrations affecting the quality of the work but as the result of such vibrations the carbide insert is bound sooner or later to break off.

A feature of the present invention which avoids these disadvantages of cutting tools previously known consists in interrupting the bearing surface for supporting the carbide insert by a shallow recess in the supporting arm of the clamping element. Consequently, the insert is then only supported at its forward end within the area of its cutting edge, as well as at its other end. If the forward edge of the bearing surface is slightly hammered down, the carbide insert will then rest upon the forward surface which now lies slightly lower, so that no vibrations will be possible. The carbide insert is thus, so to speak, supported only on two points.

In order that the carbide insert may be almost entirely utilized, it is another object and feature of the invention to provide the insert with an extension of the same size and shape but made of steel. Further, in consideration of such extension, the length of the above-mentioned recess in the supporting or bearing arm of the clamping element is preferably made smaller than the length of the extension so that the carbide part of the insert will still be able to rest solidly upon two supporting surfaces even though it has been almost entirely used up.

A further object of the present invention consists in providing a tool holder designed and constructed so as to permit one and the same carbide insert to be used both in a left-hand and a right-hand shank, and also to shift the carbide insert about its longitudinal axis within the same tool holder so as to be able to adjust the rake angle thereof. This constitutes an important advantage over similar cutting tools as previously designed insofar as they were requiring separate shanks for each individual carbide insert.

It is another feature of the invention to provide the supporting shank as well as the carbide insert of a shape designed to permit the insert to be adjusted about its longitudinal axis merely by exchanging one clamping element for another. Thus, this feature provides a second method of adjusting the desired rake angle by means of the clamping element according to the invention. More specifically, this feature consists on the one hand in providing the clamping surface of the supporting shank with a concave curvature, and, on the other hand, in providing the carbide insert of a cross-sectional shape corresponding to the contours of two superimposed trapezoids. If the clamping element be shaped accordingly, the carbide insert may then be securely clamped in a fixed position in the supporting shank within a certain angular range, with its clamping surface snugly fitting against the concave clamping surface of the supporting shank. Furthermore, in order to prevent the edges of the carbide insert facing the clamping surface of the supporting shank from digging into the clamping surface, these edges are preferably rounded off.

Another object of the present invention consists in the provision of means for assuring a snug fit of one clamping surface of the carbide insert on the corresponding clamping surface of the supporting shank in any angular position of the carbide insert. For this purpose, it is necessary to design the clamping element of a shape which will permit the carbide insert to assume a position in which the center of curvature of the arcuate clamping surface of the supporting shank coincides with the center curvature of the clamping surface of the carbide insert abutting against the clamping surface of the supporting shank. According to the present invention, the two surfaces of the trapezoidal carbide insert facing the curved clamping surface of the supporting shank are for this purpose preferably given a concave shape with the center of curvature of one surface coinciding with the center of curvature of the clamping surface of the supporting shank.

It is a further object of the invention to combine both surfaces of the double-trapezoidal carbide insert facing the clamping surface of the supporting shank so as to form a single curved surface, the center line of curvature of which coincides with that of the clamping surface of the supporting shank. Such embodiment of the invention likewise permits the carbide insert to be adjusted to a certain angular position in accordance with the desired rake angle and to be secured therein by exchanging the clamping element for another suitable to such angle. However, whereas the clamping surfaces of the carbide insert facing that of the supporting shank are curved, those of the insert facing the lateral clamping element are angularly disposed relative to each other in accordance with the double-trapezoidal cross-sectional shape thereof. Since the upper surface of the carbide insert is used for applying a clamping force thereto, such clamping force is transmitted downwardly in accordance with the respective slope of the insert so that the latter is forced down upon its supporting surface.

By providing the carbide insert in a cross-sectional shape of a double trapezoid, the further advantage is obtained according to the invention that the insert may be used either as a left-hand or right-hand tool, permitting its use in either one or the other type of supporting shank. This feature, as well as the ability to adjust the carbide insert about its longitudinal axis to any angular position within an angle of 180°, is of considerable importance in larger manufacturing plants, particularly, as it greatly aids in keeping available an adequate supply of cutting tools for all purposes.

Thus, it will generally be sufficient to keep on hand a number of different clamping elements for the various machining operations, that is, both for left-hand and right-hand shanks of the same dimensions. Over and above that, the supply of carbide inserts may then be limited to such of a certain thickness and width, and of a cross-sectional shape according to the present invention, since they may be fitted in either a left-hand or right-hand shank.

For adjusting the rake angle of the cutting tool, it is merely necessary to provide a series of clamping elements as above described which, obviously, are considerably less expensive than the supporting shanks. Thus, the present invention affords considerable saving and economy over similar tools of previous design which required a number of supporting shanks equal to that of the clamping elements. This economical feature of the invention is further enhanced by the increased versatility in the use of the carbide inserts, which may thus be applied, for example, to left-hand and right-hand side tools or knife tools, straight and bent roughing or finishing tools, as well as special tools of any kind in which cemented carbide tips are desirable.

Still another object of the present invention consists in the provision of suitable means for tightening the clamping element.

This may be accomplished according to the invention by tensioning bolts, and an additional feature of the invention consists in providing the bearing surface of the supporting shank of the clamping element with an inclination toward the narrower surface of the shank. Thus, when tightening the tension bolts, the clamping element is, as the result of such inclination, drawn like a wedge into the recess of the supporting shaft.

The present invention is, however, not limited to the use of tension bolts, but it is also possible to use pressure bolts which may be tightened against the clamping element so as to secure the same within the recess. When using pressure bolts, it is preferable to incline the bearing surface of the supporting shank of the clamping element in a direction toward the side of the shank opposite to the pressure bolts, so that the clamping element will be forced into the angular recess and abut tightly upon its bearing surface.

These, as well as further objects, features, and advantages of the present invention will become more evident from the following detailed description of several embodiments thereof, as well as from the accompanying drawings, in which:

Figs. 8 to 10 are cross sections through a cutting tool, respectively showing the carbide insert secured in various angular positions to obtain different rake angles by means of different clamping elements having a horizontal bearing surface;

Figs. 11 to 13 are cross sections through the same cutting tool as shown in Figs. 8 to 10, but respectively showing a flat carbide insert secured in various angular positions by clamping elements of different shapes;

Figure 28:
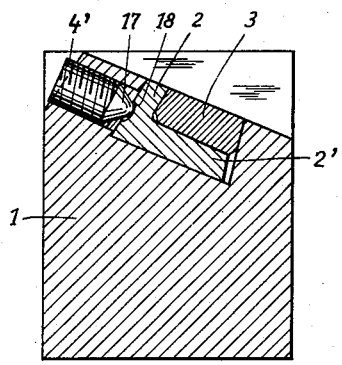
Figure 27:
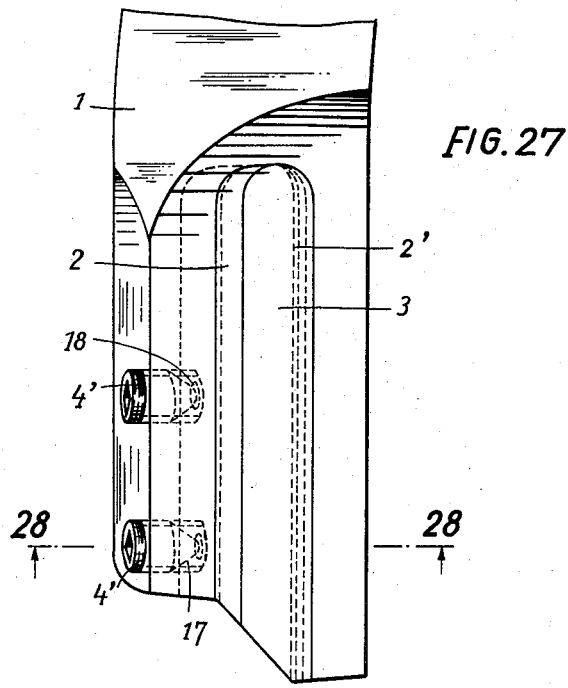

Figs. 17 to 26, respectively, are cross sections through a cutting tool having different clamping elements therein for securing the same kind of carbide inserts at different angular positions, or for securing carbide inserts of different width and thickness;

Fig. 27 shows a top view upon a cutting tool with the clamping element and the carbide insert clamped therein by means of pressure bolts; while Fig. 28 is a cross section taken along line 28—28 of Fig. 27.

Referring to the drawings, the same reference numerals are applied in the various figures to similar elements, that is, to the tool supporting shank 1, the clamping element 2, the carbide insert 3, and the clamping bolts 4. As shown particularly in Figs. 1, 3, and 7, the bearing or supporting arm 2' of the clamping element 2 is provided with a shallow recess 5 so that the insert 3 will only rest upon the front bearing surface 6 and the rear bearing surface 7. In the event that the intermittent knocking action of the cutting pressure causes a plastic deformation and a slight reduction in the thickness of that part of the supporting arm 2' which lies within the area of the bearing surface 6, the carbide insert 3 will then be able to follow to the extent of the depth of recess 5 without danger of bending to any material extent or that vibrations will occur therein. Particularly, such bending of the carbide insert will be completely avoided within the area of the cutting edges, its breakage due to such causes thus being practically impossible.

Figure 2:
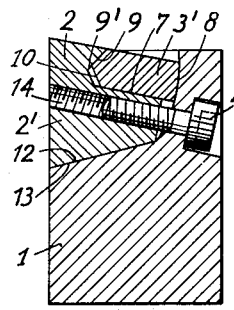
Fig. 2 is a cross section taken along line 2—2 of Fig. 1.
Figure 4:
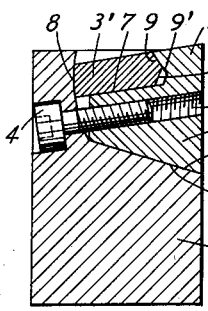
Fig. 4 is a cross section taken along line 4—4 of Fig. 3.
Figure 5:
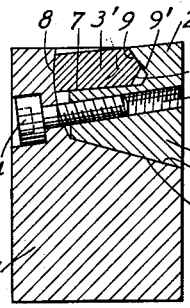
Figs. 5 and 6 are similar cross sections through the tool shown in Fig. 3, but respectively showing the tool adjusted to different rake angles by the use of different clamping elements.
Figure 6:
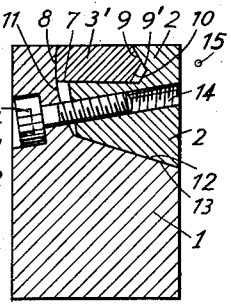
Figure 1:
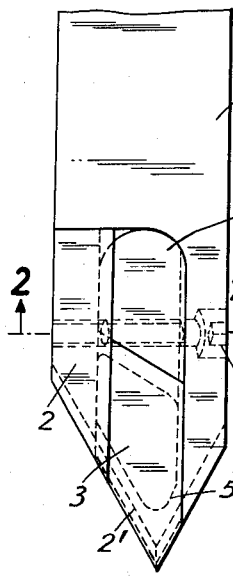
Fig. 1 shows a top view of a left-hand cutting tool according to the invention.
Figure 3:
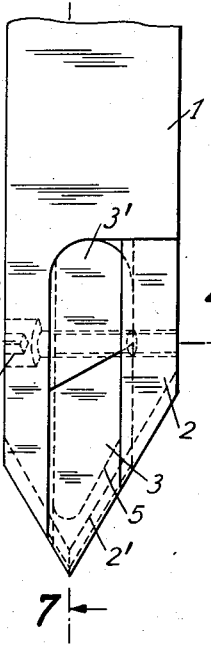
Fig. 3 is a top view of a right-hand cutting tool according to the invention.

Figs. 1 and 3 illustrate left-hand and right-hand cutting tools, respectively, in which a carbide insert 3 of the same design is inserted. The symmetrical, double-trapezoidal cross-sectional shape of the carbide insert 3, 3' permits its insertion both into the left-hand shank according to Fig. 1 or into the right-handed shank according to Fig. 3. For changing the carbide insert 3, 3' from one type of shank to the other, it is only necessary to regrind the clearance angle of the shank accordingly, while for adjusting the insert to a different rake angle, the clamping element 2 simply has to be exchanged for one of a shape which admits such desired angle. Thus, the clamping surfaces 8, 9, and 10 of the carbide insert 3, 3', and the bearing surfaces 7 and 13 of the clamping element 2 and the supporting shank 1, respectively, are shaped according to the invention so as to cooperate with each other.

The right-hand tools shown in cross section in Figs. 3 to 6, respectively, consist in each case of the same kind of supporting shank 1, carbide insert 3, 3', and clamping bolt 4. The tools illustrated in Figs. 4 to 6 differ from each other only by the clamping element 2, the cross sectional shape of which is in each case adapted to comply with the desired angular position of the carbide insert 3, 3'. Such angular adjustment admits rake angles of 0° according to Fig. 6, 5° according to Fig. 5, and 10° according to Fig. 4. Obviously, any other rake angle may be adjusted by providing a different clamping element 2. The bearing surface 7 and the clamping surface 9' of the clamping element 2 are so positioned relative to each other that the center of curvature 15 of the clamping surface 11 of the supporting shank 1 coincides with that of the clamping surface 8 of the carbide insert 3, 3'. This geometric condition also determines the cross-sectional shape of the various clamping elements 2, as illustrated in Figs. 2, 4, 5, and 6. Since these different elements 2 should in each case fit into the same supporting shank 1, their position in the shank 1 also determines the position of the threads 14 in the clamping element 2 for receiving the clamping bolt 4. The bearing surface 13 of the shank 1 for supporting the arm 2' of the clamping element 2 is inclined toward the lateral surface of the shank 1. The clamping bolt 4 is thus able to draw the clamping element 2 and the carbide insert 3, 3' like a wedge against the bearing surface 13 and the curved clamping surface 11 of the shank 1 so that they will abut rigidly and without play on these surfaces.

Figs. 8 to 10 diagrammatically illustrate the adjustment of rake angles of 0° and 10°, respectively, Figs. 9 and 10 differing from each other by the different direction of inclination of the insert relative to the horizontal. The tool holder 1 in this case differs from those shown in Figs. 2 to 5 by its horizontal bearing surface 13'. The center of curvature 15 of the clamping element 11 of the shank 1 also forms the center of curvature of the upper part 16 of the clamping surface of the carbide insert 3 facing the shank. The lower part 17 of this surface has the same radius as the part 16 but its center of curvature 15' is spaced from the center 15, so that the carbide insert 3 when turned 180° about its longitudinal axis may be inserted into a left-hand shank 1 which has a clamping surface 11 of the same curvature. In such case the clamping surface 17 then forms the upper part of the entire surface and abuts against the curved clamping surface 11 of the left-hand shank 1.

As illustrated in Figs. 8 to 10, the cross-sectional shape of the clamping element 2 or the position of its clamping surface 9' and its bearing surface 7 for supporting the insert 3 is dependent upon the desired angle of adjustment in which the insert is to be mounted in the supporting shank 1. The cross-sectional shape of the clamping element 2 furthermore depends upon the position of the center of curvature 15 of the clamping surface 11 of the shank 1 so that a snug fit of the clamping surface 16 of the insert 3 upon the clamping surface 11 of the shank 1 will be assured.

Figs. 11 to 13, respectively, illustrate the same kind of supporting shank 1 as shown in Figs. 8 to 10, with an insert 3 in angular positions of 0° to 5°, but of considerably smaller thickness. Accordingly, the cross-sectional area of the clamping element 2 as well as the position of the center of curvature 15' of the clamping surface 17 of the insert 3 are likewise changed. It is merely coincidental that the centers of curvature 15 and 15' in Figs. 11 to 13 coincide with the edges of the insert 3 facing the clamping element 2. While in the right-hand tool as shown the clamping surface 16 abuts against the clamping surface 11 of the supporting shank, the same insert when fitted into a left-hand shank will then abut with its clamping surface 17 against the clamping surface 11 of such shank, while the surface 16 will be spaced therefrom.

Figure 14:
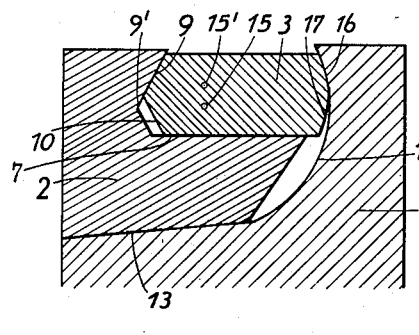
Figs. 14 to 16 are cross sections through a cutting tool similar to that shown in Figs. 8 to 13, but respectively provided with a clamping element having a bearing surface which is inclined toward the lateral surface of the supporting shank.
Figure 17:
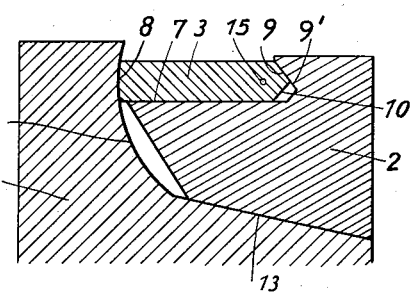
Figure 15:
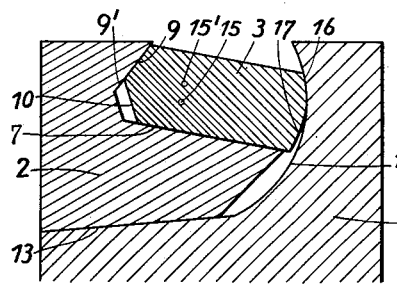
Figure 18:
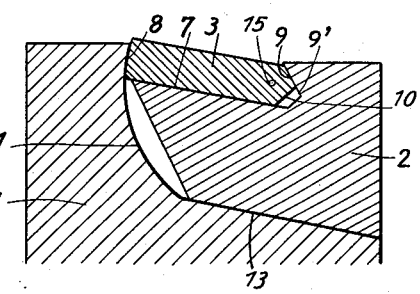
Figure 16:
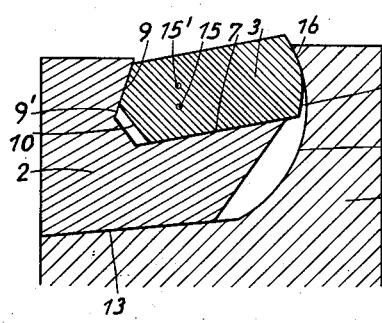
Figure 19:
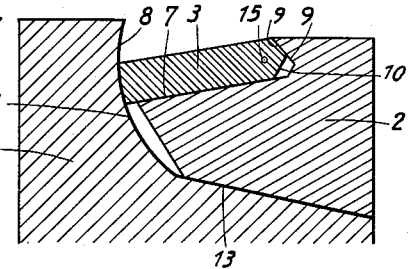
Figure 20:
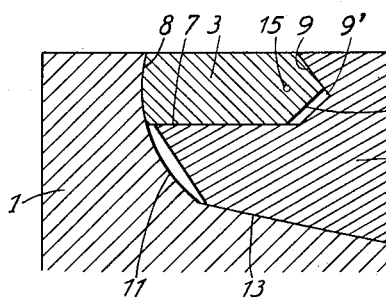
Figure 21:
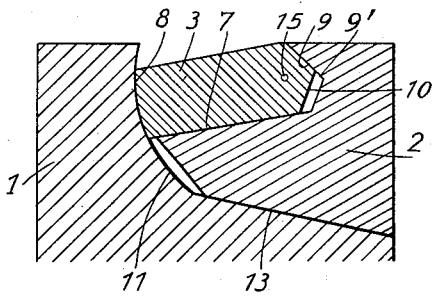
Figure 22:
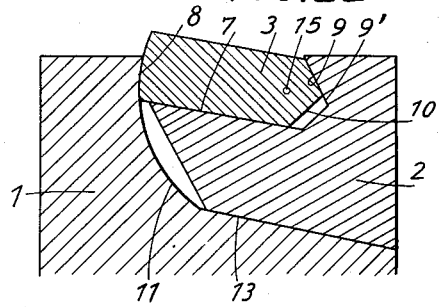
Figure 23:
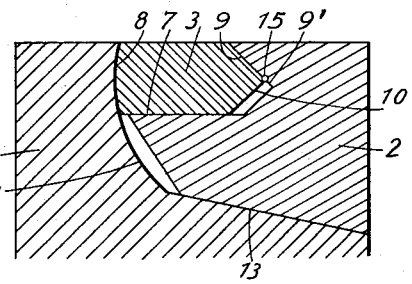
Figure 24:
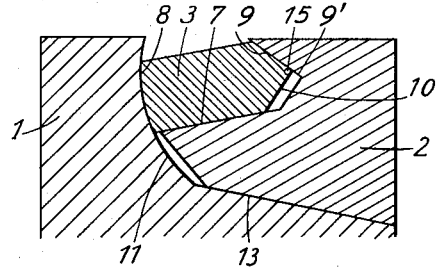
Figure 25:
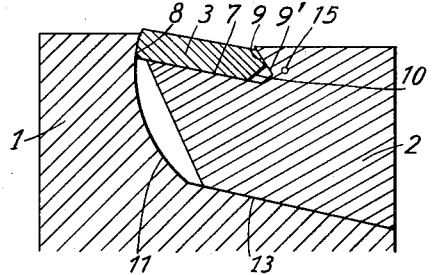
Figure 26:
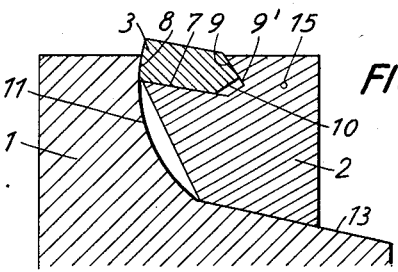

Figs. 14 to 16, respectively, illustrate a similar supporting shank as previously described. However, this left-hand shank is provided with a bearing surface 13 which is inclined toward the lateral surface 2 similarly as shown in Figs. 3 to 6. Concerning the position of the centers of curvature 15 and 15', the shape and construction of the clamping surfaces 9, 10, 16, and 17 of the carbide insert 3, the clamping surface 11 of the supporting shank 1, the bearing surface 7 of the clamping element 2, and the clamping surface 9' thereof, the same applies to what has been stated with regard to Figs. 8 to 13.

Figs. 17 to 26, respectively, show a similar right-hand shank 1. However, in these embodiments of the invention the clamping elements 2 have a different shape from those shown in Figs. 14 to 16, having a cross-sectional shape made in accordance with the thickness and position of the inserts 3. The carbide insert 3 is also of the same double-trapezoidal shape as previously described. The lateral surfaces of the insert 3 facing the shank 1 are, however, formed of only a single curved clamping surface 8, the center of curvature 15 of which coincides with that of the clamping surface 11 of the supporting shank 1 about which the insert 3 inclines in each individual case. The desired angle of the insert 3, shown in these drawings to be, for example, 0°, 5°, and 10°, determines in each case the necessary cross-sectional area of the clamping element 2. For producing the required clamping force and a solid connection between the supporting shank 1, the clamping element 2, and the carbide insert 3, clamping bolts either acting by tension or pressure as shown in Figs. 1 to 7 and 27 and 28, or tie rods, wedges, or the like, may be provided. Inasmuch as a variety of devices are commonly known for this purpose and they by themselves do not form a part of the invention, their illustration has been omitted in Figs. 8 to 26.

Finally, the cutting tool illustrated in Figs. 27 and 28 is likewise a left-hand tool. The clamping action upon the carbide inserts 3 and the clamping element 2 of this modification is produced by pressure bolts 4', rather than by tension bolts or similar means as in the embodiments of the invention previously described. The recess in the supporting shank 1 is made in the form of a longitudinal groove so that the bearing arm 2' of the clamping element 2 lies between two webs of the supporting shank 1. The bearing surface 19 is inclined toward the side of the supporting shank 1 which faces in the opposite direction to the pressure bolts 4'. While one web of the shank 1 forms bearing surface 20 for one longitudinal side of the carbide insert 3, the other serves to receive the pressure bolts 4' which are each provided with a rounded tip 17 which engages in a troughlike depression 18 in the clamping element 2 so as to force the carbide insert 3 against the clamping surface 20 of the shank 1. As a result of the trapezoidal shape of the carbide insert 3, the latter when being clamped rests solidly on the bearing arm 2' of the clamping element 2 and in contact therewith along its entire length.

Similarly as in the embodiments of the invention shown in Figs. 1 to 26, the use of carbide inserts 3 of various cross-sectional shape or size only requires the clamping element 2 to be exchanged. Thus, it is in each case only necessary to choose a clamping element of a size in accordance with the shape of the insert whereas the supporting shank may remain without any change. The arrangement of the clamping element 2 as illustrated in Figs. 27 and 28, is, however, not as versatile in its use as those shown previously for the reason that the possibility of adjusting the carbide insert about its longitudinal axis is considerably more limited. The advantages of the angular clamping element as previously described are, however, equally present in this embodiment of the invention.

Figure 7:
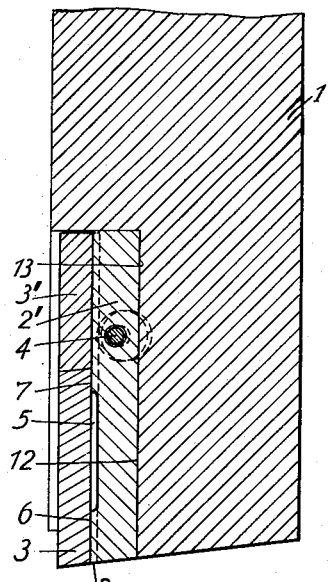
Fig. 7 is a cross section taken along line 7—7 of Fig. 3.

As earlier described, and shown in Figs. 1, 3, and 7, a further saving in carbide material may be obtained by brazing an extension 3' of ordinary steel on the rear end of the carbide tip 3. This extension 3' should be of the same cross-sectional shape and size as the carbide tip 3 so that the tip 3 can be reground and clamped into the tool holder until it is used up entirely. In order to obtain the advantages of the two-point support of the insert 3, 3', even though the carbide tip 3 has been ground off almost entirely, the length of the shallow recess 5 in the bearing portion of the clamping element 2 is preferably made of a length shorter than that of the extension 3'. Thus, there will still be a solid base both directly underneath the cutting edge of the carbide tip 3 as well as the rear end of the extension 3' even though only a small sliver of carbide remains on the extension 3'. The minimum distance of the beginning of the recess 5 from the forward edge of the clamping element 2, that is, the length of the solid supporting portion at the forward end of the clamping element 2, depends upon the cutting pressure to which the tool will be subjected. Thus, for lower cutting pressures, such solid supporting portion may be made shorter than for heavy work, such lighter work thus also permitting the carbide material 3 on the extension 3' to be used up more extensively than in heavy work where there is greater danger that such solid portion be deformed.

Although in the above description of the invention, I have only spoken of cutting inserts or tips made of cemented carbides, it is to be understood that the invention is not restricted to such materials but is equally applicable to such inserts or tips made of any other hard metal, the term "carbide" or "cemented carbide" thus only being used to exemplify any such hard and expensive metal.

While I have described my invention with reference to the preferred embodiments thereof I wish to have it understood that it is in no way limited to the details of such embodiments or to the specific examples described, but is capable of numerous modifications within the scope of the appended claims.

Having thus fully described my invention, what I claim is:

1. A cutting tool comprising in combination, a shank having a cutout in the upper surface along its front part forming a lateral recess, a cutting insert of hard metal in said cutout; said insert being a substantially flat plate having at one side a prismatic contour formed by two surfaces converging at an acute angle; a substantially L-shaped element substantially within said cutout for clamping said insert between said element and one side wall in said cutout; said clamping element having, at the smaller of the legs of said L, a surface of substantially the shape of the outer of said converging surfaces of said insert, said insert being seated with one of its larger and flat sides on the upper flat surface of the larger of the legs of said L; the bottom wall of said cutout in said shank being downwardly inclined toward the recessed side of said shank, said substantially L-shaped element having a seating surface of substantially the same shape and inclination as said inclined bottom wall so as to snugly engage the latter; and means to secure said element to said shank and force said smaller leg of said element into clamping engagement with said one side of said insert.

2. A cutting tool as defined in claim 1, wherein the side wall of said recess in said shank has a concave curvature, said cutting insert having a cross-sectional shape similar to two superimposed trapezoids, the two adjacent side walls of said two trapezoids facing said concave wall having slightly convex curvatures, the center of curvature of one of said convex walls substantially coinciding with the center of curvature of said concave wall of said shank.

3. A cutting tool as defined in claim 1, wherein the side wall of said recess in said shank has a concave curvature, said cutting insert having a cross-sectional shape similar to two superimposed trapezoids, the two adjacent side walls of said two trapezoids facing said concave wall having slightly convex curvatures, the radii of curvature of both of said convex walls being substantially the same as that of the curvature of said concave wall of said shank.

4. A cutting tool as defined in claim 1, wherein said forcing means comprise at least one threaded pressure bolt in the non-recessed side of said shank and adapted to engage a threaded hole in said clamping element to pull the same into clamping engagement with said cutting insert, the axis of said pressure bolt being inclined in opposite direction with respect to the incline of said bottom wall.

References Cited in the file of this patent

UNITED STATES PATENTS

| | | |
|---|---|---|
| 932,286 | Jones | Aug. 24, 1909 |
| 1,011,715 | Baker | Dec. 12, 1911 |
| 1,111,181 | Rikof | Sept. 22, 1914 |
| 1,271,299 | Fish | July 2, 1918 |
| 2,241,024 | Wahnish | May 6, 1941 |
| 2,480,226 | Deibert | Aug. 30, 1949 |
| 2,500,387 | Sheridan | Mar. 14, 1950 |

FOREIGN PATENTS

| | | |
|---|---|---|
| 219,136 | Great Britain | July 24, 1924 |

OTHER REFERENCES

American Machinist (Super Tool Co.), published July 18, 1946 (page 283 relied on).